US010915781B2

(12) United States Patent
Lin et al.

(10) Patent No.: US 10,915,781 B2
(45) Date of Patent: Feb. 9, 2021

(54) SCENE RECONSTRUCTING SYSTEM, SCENE RECONSTRUCTING METHOD AND NON-TRANSITORY COMPUTER-READABLE MEDIUM

(71) Applicant: HTC Corporation, Taoyuan (TW)

(72) Inventors: Cheng-Hsien Lin, Taoyuan (TW); Po-Chuan Cho, Taoyuan (TW); Yen-Jung Lee, Taoyuan (TW); Hung-Yi Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 203 days.

(21) Appl. No.: 16/286,599

(22) Filed: Feb. 27, 2019

(65) Prior Publication Data

US 2019/0325251 A1 Oct. 24, 2019

Related U.S. Application Data

(60) Provisional application No. 62/636,859, filed on Mar. 1, 2018.

(51) Int. Cl.
*G06K 9/00* (2006.01)
*G06K 9/46* (2006.01)
(Continued)

(52) U.S. Cl.
CPC ......... *G06K 9/4609* (2013.01); *G06K 9/6202* (2013.01); *G06T 19/20* (2013.01)

(58) Field of Classification Search
CPC .............. G06K 9/4609; G06K 9/6202; G06K 9/00671; G06T 19/20; G06T 2207/10016;
(Continued)

(56) References Cited

U.S. PATENT DOCUMENTS 10,043,238 B2 * 8/2018 Bean .................... G06T 7/20
10,482,674 B1 * 11/2019 Wu .................. G06Q 30/0276
(Continued)

FOREIGN PATENT DOCUMENTS

CN 102419631 A 4/2012
CN 103139480 A 6/2013
(Continued)

OTHER PUBLICATIONS

Corresponding Chinese office action dated Sep. 16, 2020.

*Primary Examiner* — Van D Huynh
(74) *Attorney, Agent, or Firm* — CKC & Partners Co., LLC

(57) ABSTRACT

A scene reconstructing system, scene reconstructing method and non-transitory computer-readable medium are provided in this disclosure. The scene reconstructing system includes a first electronic device and a second electronic device. A first electronic device includes a first camera unit, a first processor, and a first communication unit. The first processor is configured for recognizing at least a first object from a first image to construct a first map. The second electronic device includes a second camera unit, a second processor, and a second communication unit. The second processor is configured for recognizing at least a second object from a second image to construct a second map; calculating a plurality of confidence values corresponding to the second map. The second communication unit is configured for transmitting a location information to the first communication unit according to the plurality of confidence values.

21 Claims, 14 Drawing Sheets

(51) Int. Cl.
*G06T 19/20* (2011.01)
*G06K 9/62* (2006.01)

(58) Field of Classification Search
CPC ....... G06T 7/246; G06T 19/006; H04N 5/232; H04N 1/00249
USPC ........................................................ 382/199
See application file for complete search history.

(56) References Cited

U.S. PATENT DOCUMENTS

| | | | | |
|---|---|---|---|---|
| 2012/0092328 | A1* | 4/2012 | Flaks | G06F 3/012 345/419 |
| 2014/0323148 | A1* | 10/2014 | Schmalstieg | G01C 21/20 455/456.1 |
| 2015/0193982 | A1* | 7/2015 | Mihelich | H04L 67/18 345/633 |
| 2015/0356738 | A1* | 12/2015 | Yoon | H04N 5/2258 348/47 |
| 2018/0189955 | A1* | 7/2018 | Moshe | G06K 9/6256 |
| 2018/0302612 | A1* | 10/2018 | Kopf | H04N 13/221 |
| 2019/0191125 | A1* | 6/2019 | Fink | H04L 65/80 |
| 2019/0371073 | A1* | 12/2019 | Harviainen | G06F 3/011 |

FOREIGN PATENT DOCUMENTS

| | | |
|---|---|---|
| CN | 107360364 A | 11/2017 |
| CN | 107463180 A | 12/2017 |
| CN | 107678535 A | 2/2018 |
| KR | 20130058414 A | 6/2013 |
| WO | 2016051366 A2 | 4/2016 |
| WO | 2017120660 A1 | 7/2017 |
| WO | 2017132506 A1 | 8/2017 |

\* cited by examiner

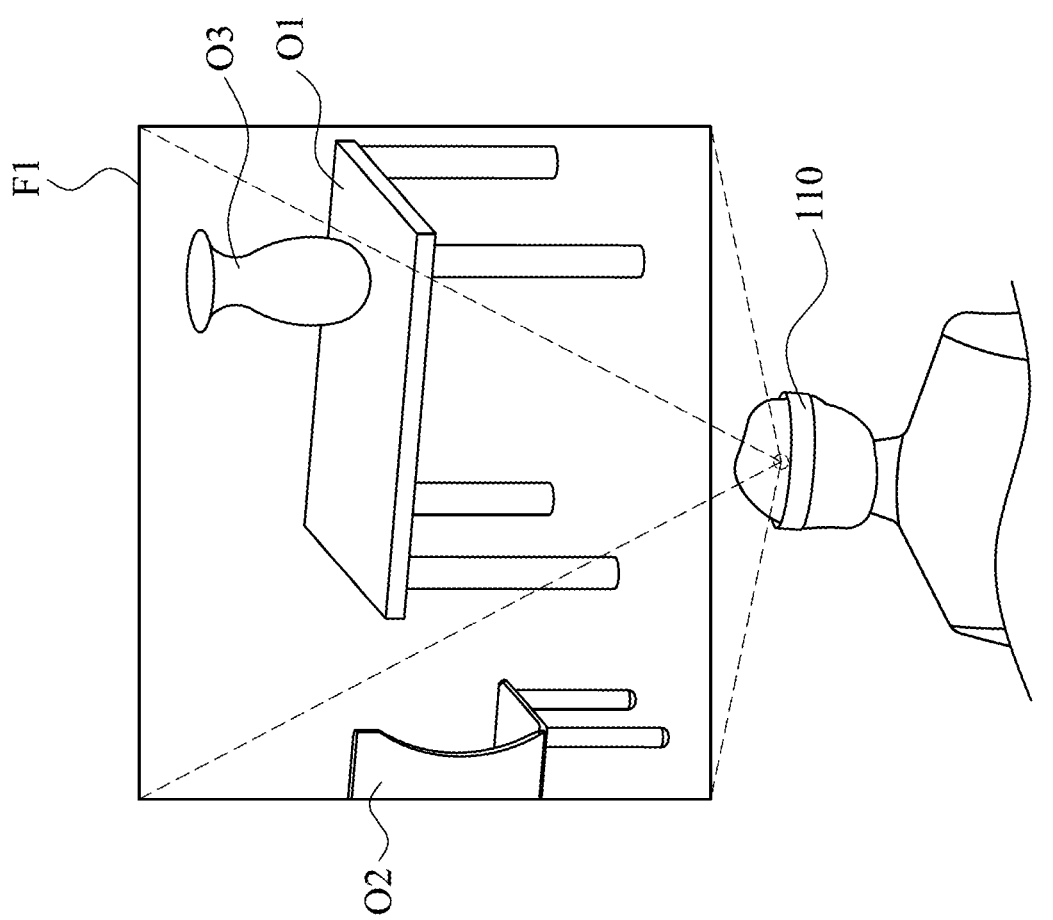

SCENE RECONSTRUCTING SYSTEM, SCENE RECONSTRUCTING METHOD AND NON-TRANSITORY COMPUTER-READABLE MEDIUM

CROSS-REFERENCE TO RELATED APPLICATION

This application claims priority to U.S. Provisional Application Ser. No. 62/636,859, filed on Mar. 1, 2018, which is herein incorporated by reference.

BACKGROUND

Field of Invention

The disclosure relates to a system, method and non-transitory computer-readable medium. More particularly, the disclosure relates to a system and method for scene reconstructing in the mixed reality system and non-transitory computer-readable medium.

Description of Related Art

The scene reconstruction is an important topic in the augmented reality (AR) system or the mixed reality (MR) system. However, the scene reconstruction generally relies on manual scanning by users, or multiple fixed sensors are installed. The way of manual scanning to reconstruct the scene has some problem, when the scene is updated. Because of the blind angle, the way of multiple fixed sensors to reconstruct the scene will be only updated certain regions. Therefore, a system for utilizing the mobile sensors to support scene reconstruction in the mixed reality is required.

SUMMARY

An aspect of the disclosure is to provide a scene reconstructing system including a first electronic device and a second electronic device. The first electronic device is located in a physical environment. The first electronic device includes a first camera unit, a first processor and a first communication unit. The first processor is electrically coupled to the first camera unit and the first communication unit. The first camera unit is configured for capturing a first image of the physical environment. The first processor is configured for recognizing at least a first object from the first image to construct a first map of the physical environment. The second electronic device is located in a physical environment. The second electronic device includes a second camera unit, a second processor and, a second communication unit. The second processor is electrically coupled to the second camera unit and the second communication unit. The second camera unit is configured for capturing a second image of the physical environment. The second processor is configured for recognizing at least a second object from the second image to construct a second map of the physical environment; calculating a plurality of confidence values corresponding to the second map. The second communication unit is configured for transmitting a location information to the first communication unit according to the plurality of confidence values; wherein the first camera unit is configured for capturing a third image corresponding to the location information of the physical environment, and the first communication unit is further configured for transmitting the third image to the second communication unit; the second processor is configured for recognizing at least a third object from the third image and reconstructing the second map according to the at least the third object.

Another aspect of the disclosure is to provide a scene reconstructing method. The scene reconstructing method includes operations of: capturing a first image of a physical environment by a first electronic device and capturing a second image of the physical environment by a second electronic device; recognizing at least a first object from the first image to construct a first map of the physical environment by the first electronic device; recognizing at least a second object from the second image to construct a second map of the physical environment, and calculating a plurality of confidence values corresponding to the second map by the second electronic device; transmitting a location information to the first electronic device by the second electronic device according to the plurality of confidence values and capturing a third image corresponding to the location information of the physical environment; transmitting the third image to the second electronic device by the first electronic device, and recognizing at least a third object from the third image by the second electronic device; and reconstructing the second map according to the at least the third object by the second electronic device.

Another aspect of the disclosure is to provide a non-transitory computer-readable medium including one or more sequences of instructions to be executed by a first processor of a first electronic device and a second processor of a second electronic device for performing a scene reconstructing method, wherein the method includes operations of: capturing a first image of a physical environment by a first electronic device and capturing a second image of the physical environment by a second electronic device; recognizing at least a first object from the first image to construct a first map of the physical environment by the first electronic device; recognizing at least a second object from the second image to construct a second map of the physical environment, and calculating a plurality of confidence values corresponding to the second map by the second electronic device; transmitting a location information to the first electronic device by the second electronic device according to the plurality of confidence values and capturing a third image corresponding to the location information of the physical environment; transmitting the third image to the second electronic device by the first electronic device, and recognizing at least a third object from the third image by the second electronic device; and reconstructing the second map according to the at least the third object by the second electronic device.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3B is a schematic diagram illustrating an image according to an embodiment of this disclosure.

DETAILED DESCRIPTION

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
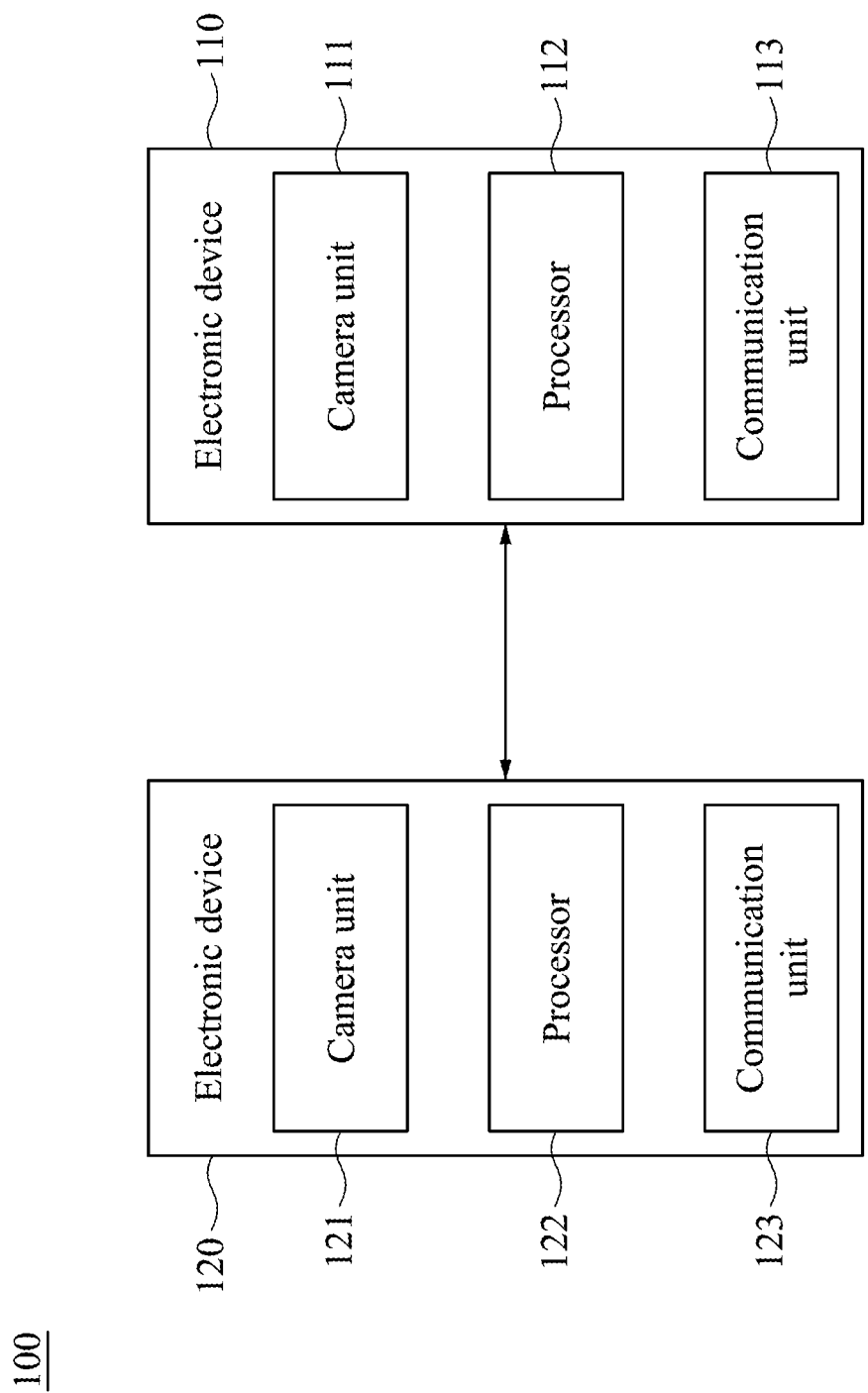
FIG. 1 is a functional block diagram illustrating a scene reconstructing system according to an embodiment of the disclosure.

Reference is made to FIG. 1, which is a functional block diagram illustrating a scene reconstructing system 100 according to an embodiment of the disclosure. As shown in FIG. 1, the scene reconstructing system 100 includes electronic devices 110 and 120. The electronic devices 110 and 120 are located in a physical environment, and the electronic devices 110 and 120 are communicated with each other. In some embodiments, the electronic device 110 can be a device of an augmented reality (AR) system, a device of a virtual reality (VR) system with inside-out camera or a mixed reality (MR) system, such as a head-mounted display (HMD) or a wearable device. The electronic device 120 can be implemented as a fixed sensor, a mobile sensor, a smart phone or a head-mounted device communicated with the electronic device 110.

The electronic device 110 includes a camera unit 111, a processor 112 and a communication unit 113. The processor 112 is electrically connected to the camera unit 111 and the communication unit 113. The electronic device 120 includes a camera unit 121, a processor 122 and a communication unit 123. The processor 122 is electrically connected to the camera unit 121 and the communication unit 123. The processor 112 and 122 can be implemented as a central processing unit, a control circuit and/or a graphics processing unit. In some embodiments, the processor 112 and 122 can be implemented as a cloud server. The camera unit 111 can include one camera component located at the front side of the head-mounted device, and the camera unit 121 can include one camera component located on the mobile device or the head-mounted device. In some embodiments, the camera units 111 and 121 can include a dual camera module and/or a depth camera. In some embodiments, the communication units 113 and 123 can include a WiFi transceiver, a WiFi-Direct transceiver, a Bluetooth transceiver, a BLE transceiver, a Zigbee transceiver and/or any applicable wireless communication transceiver.

In the embodiment, the electronic device 110 further includes a displayer (not shown in FIG. 1). When a user wears the electronic device 110, the displayer will cover visions of the user, and the displayer is configured for displaying a mixed reality scene or an augmented reality scene to the user.

Figure 2:
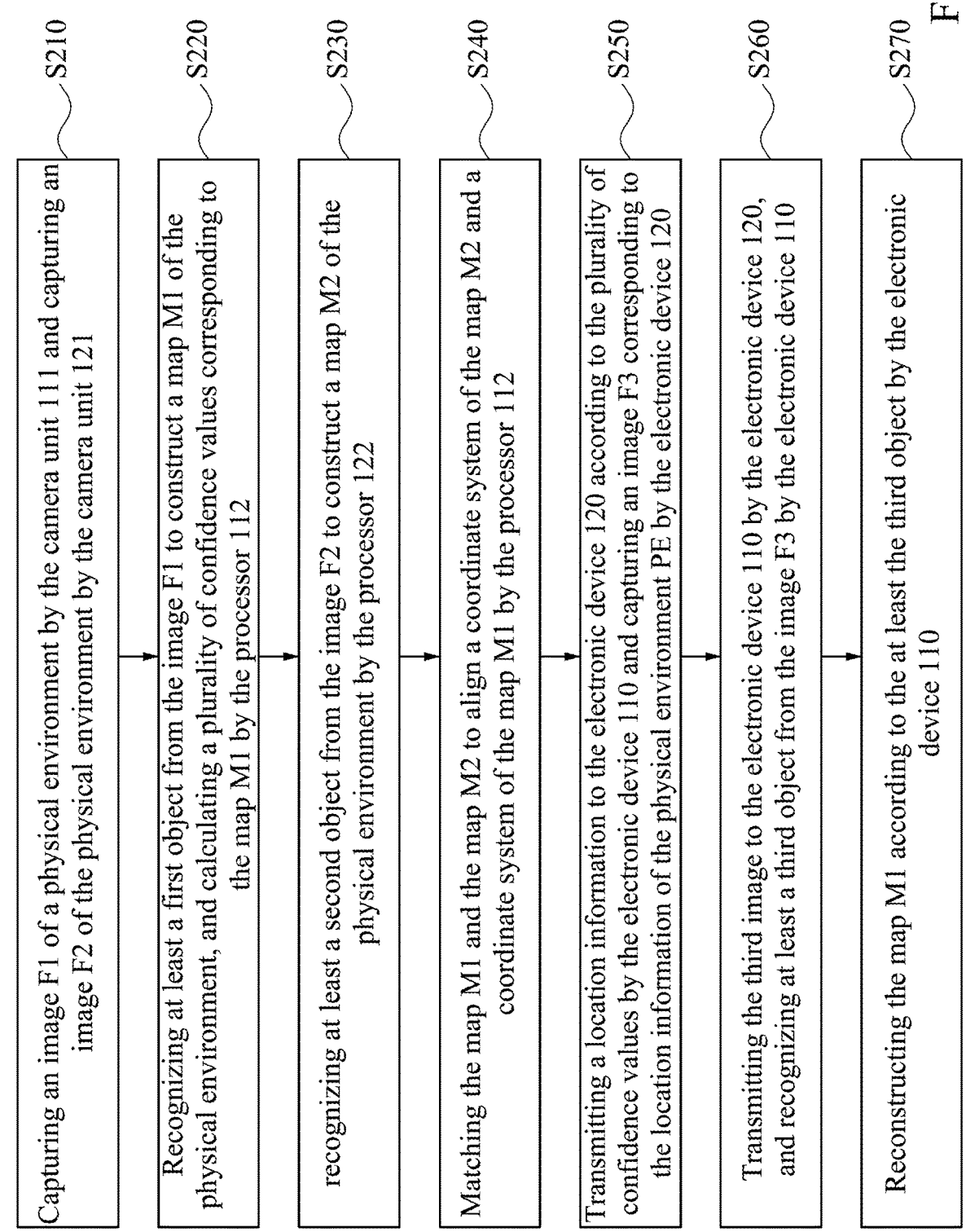
FIG. 2 is a flow diagram illustrating a scene reconstructing method according to an embodiment of this disclosure.

Reference is made to FIG. 2, which is a flow diagram illustrating a scene reconstructing method 200 according to an embodiment of this disclosure. In the embodiment, the scene reconstructing method 200 for generating a three dimensional map of the physical environment, and utilizing the additional information received from another electronic device to reconstruct the three dimensional map. In this disclosure, the electronic device 120 can support the electronic device 110 to reconstruct the scene.

Figure 3A:
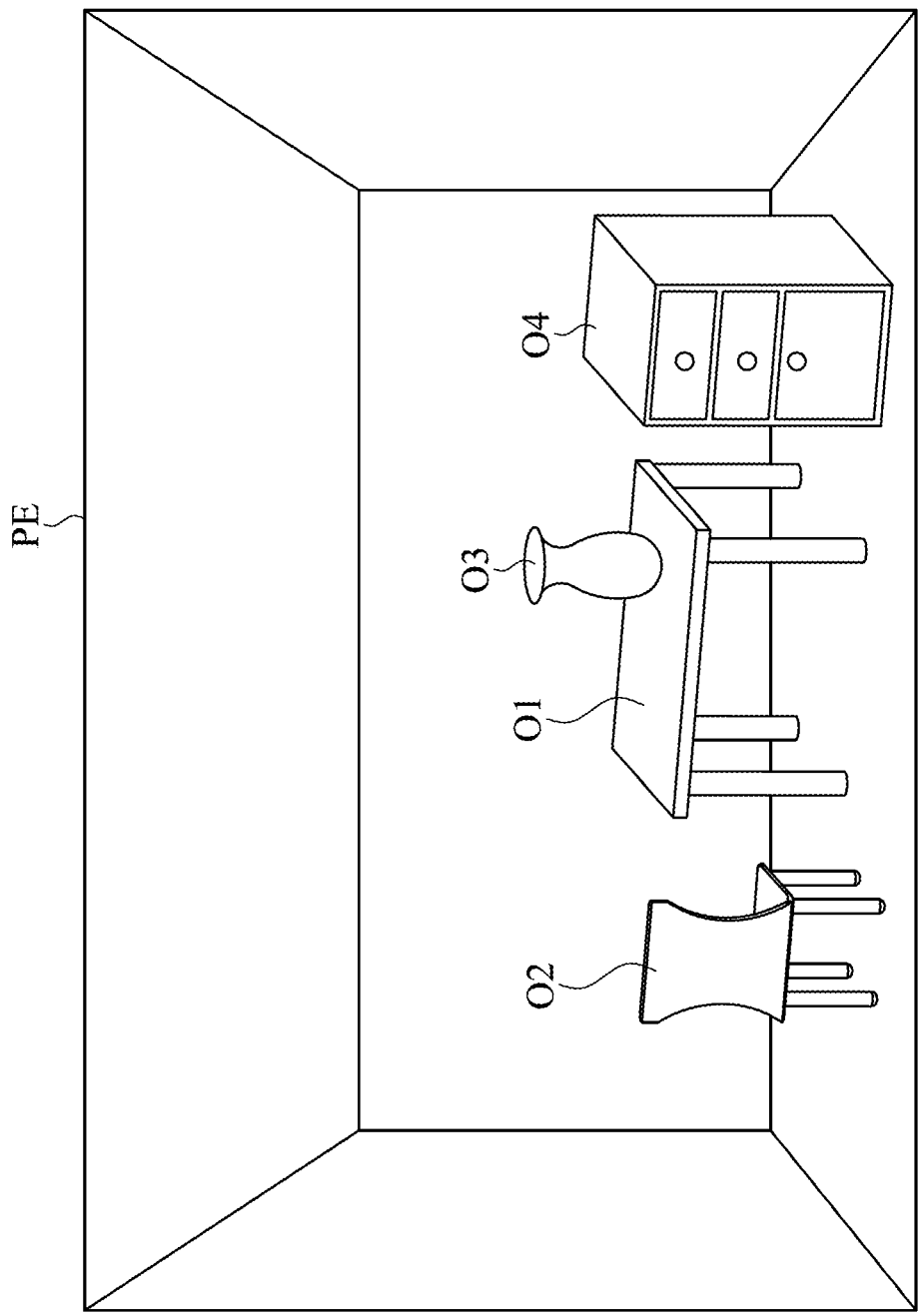
FIG. 3A is a schematic diagram illustrating a physical environment according to an embodiment of this disclosure.

Reference is made to FIG. 1 and FIG. 2. As the embodiment shown in FIG. 2, the scene reconstructing method 200 firstly executes step S210 to capture an image F1 of a physical environment by the camera unit 111 and capture an image F2 of the physical environment by the camera unit 121. Reference is made to FIG. 3A, which is a schematic diagram illustrating a physical environment PE according to an embodiment of this disclosure. In the embodiment, the physical environment PE can include the object O1 (e.g. the table), the object O2 (e.g. the chair), the object O3 (e.g. the vase), and the object O4 (e.g. the cupboard).

Figure 3C:
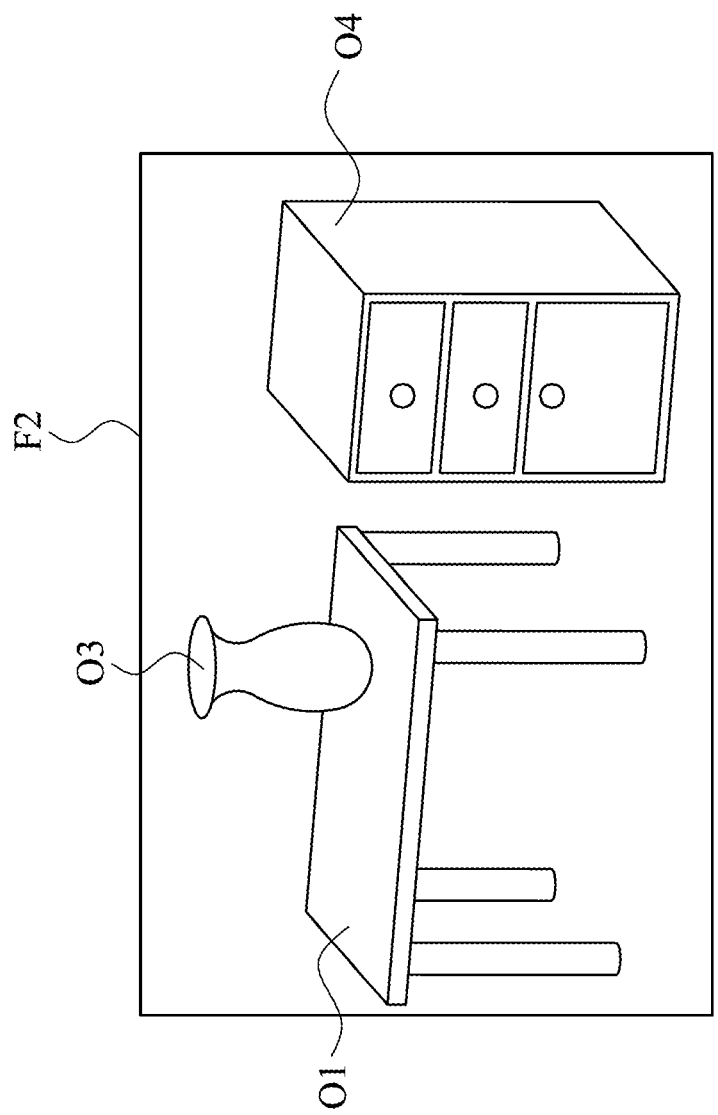
FIG. 3C is a schematic diagram illustrating an image according to an embodiment of this disclosure.

Reference is made to FIG. 3B, which is a schematic diagram illustrating an image F1 according to an embodiment of this disclosure. In the embodiment, the camera unit 111 is configured to capture the image F1, and the image F1 includes the object O1, portion of the object O2, and the object O3. Reference is made to FIG. 3C, which is a schematic diagram illustrating an image F2 according to an embodiment of this disclosure. In the embodiment, the camera unit 121 is configured to capture the image F2, and the image F2 includes the object O1, the object O3 and the object O4. It is noticed that, the camera unit 111 is configured to capture the image of the physical environment over time, and only one image is shown in FIG. 3B for simplicity. For similar reason, the camera unit 121 is configured to capture the image of the physical environment over time, and only one image is shown in FIG. 3C for simplicity.

Afterward, the scene reconstructing method 200 executes step S220 to recognize at least a first object from the image F1 to construct a map M1 of the physical environment PE, and calculate a plurality of confidence values corresponding to the map M1 by the processor 112. In this case, the map M1 is a three dimension map of the physical environment PE. Before constructing the map M1, the processor 112 is configured to recognize the image F1. For example, the processor 112 can utilize a deep neural network (DNN) algorithm to recognize the object in the image F1 or a support vector machines (SVM) to classify the image data of the image F1. In another embodiment, the processor 112 also can utilize simultaneous localization and mapping (SLAM) technology to construct the map of the physical environment.

Figure 4A:
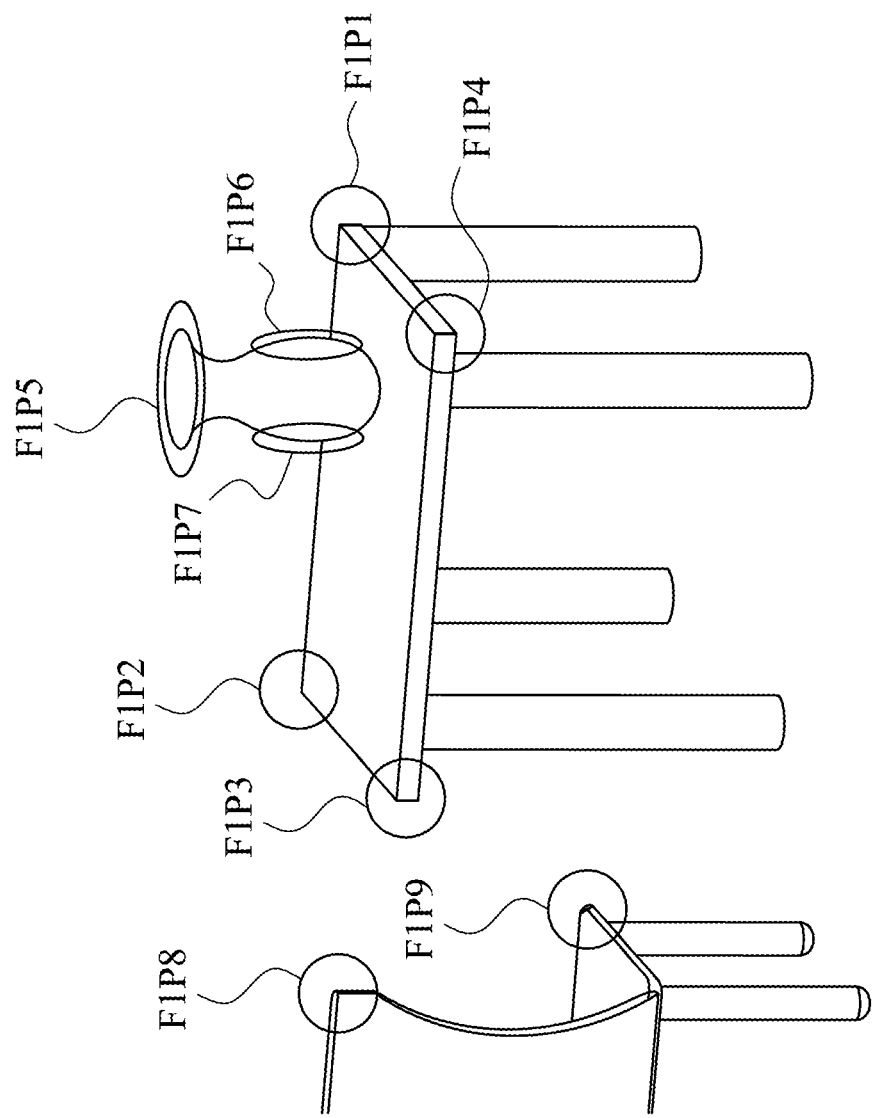
FIG. 4A is a schematic diagram illustrating the feature points of the image according to an embodiment of this disclosure.

Take the SLAM technology as an example, the processor 112 is configured to extract the feature points from the image F1. Reference is made to FIG. 4A, which is a schematic diagram illustrating the feature points of the image F1 according to an embodiment of this disclosure. In aforesaid embodiment, the processor 112 is configured to extract the feature points F1P1, F1P2, F1P3 and F1P4 of the object O1, the feature points F1P5, F1P6 and F1P7 of the object O3, and the feature points F1P8 and F1P9 of the object O2 according to the image F1 captured by the camera unit 111. The feature points F1P1~F1P9 include descriptors and two dimensional (2D) coordinates of the feature points F1P1~F1P9 within the image F1. In general, the descriptor of a feature point may indicate features such as a corner, a blob, an edge, a line, a texture, a color, etc. However, the disclosure is not limited thereto.

Figure 4B:
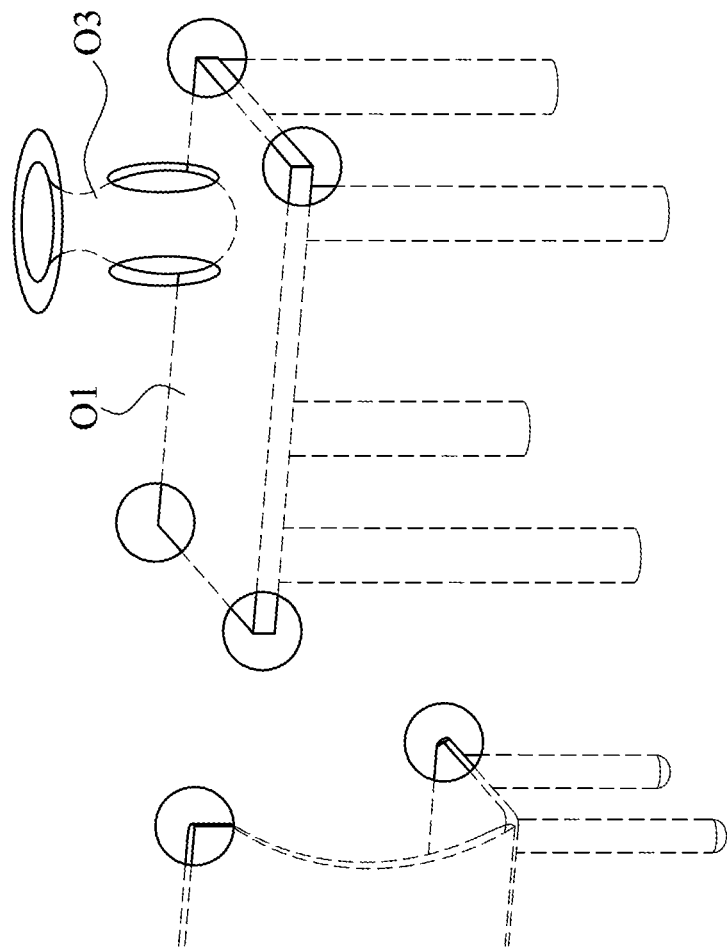
FIG. 4B is a schematic diagram illustrating the map according to an embodiment of this disclosure.

Reference is made to FIG. 4B, which is a schematic diagram illustrating the map M1 according to an embodiment of this disclosure. In the embodiment, the processor 112 is configured to construct the map M1 according to the feature points F1P1~F1P9 (the coordinate of the z-axis of the feature points can be obtained by multi-view sensor or depth sensor). As shown in FIG. 4B, the feature points F1P1~F1P4 can be recognized as the object O1 and the processor 112 is configured to render a model of the object O1 (e.g. a model of the table) on the map M1 when the object O1 is recognized. The feature points F1P5~F1P7 can be recognized as the object O3 and the processor 112 is configured to render a model of the object O3 (e.g. a model of the vase) on the map M1 when the object O3 is recognized. However, the feature points F1P8 and F1P9 cannot be recognized as the object O2, because amount of the feature points or view of the object O2 in image F2 is not sufficient, and then the processor 112 cannot render a model of the object O2 on the map M1. Thus, the map M1 includes the object O1 and object O3.

In another embodiment, if it is utilized the deep neural network algorithm or the support vector machines to recognize the image F1, the object O2 also cannot be recognized as a chair. Because the object O2 does not completely appear in the image F1 (the image F1 only provides an angle of the object O2 without distinctive feature points) or the distance between the object O2 and the camera unit 111 is too far (the object O2 cannot be recognized, because a region of the object O2 in the image F1 is too small), it is difficult to recognize the object O2 as a chair only using the image F1.

Afterwards, the processor 112 is configured to calculate a plurality of confidence values corresponding to the map M1. Based on aforesaid embodiment, if the recognizing method is utilized the SLAM technology, the confidence values can be obtained by amount of the feature points. If the recognizing method is utilized the deep neural network algorithm or the support vector machines, the confidence values can be obtained by a probability of classification (e.g. table, chair, window, vase, cupboard, bottle, etc.). In this case, each of the confidence values is corresponding to each pixel of the map M1, and the region of the object O2 will be the region with the lower confidence values.

Figure 5A:
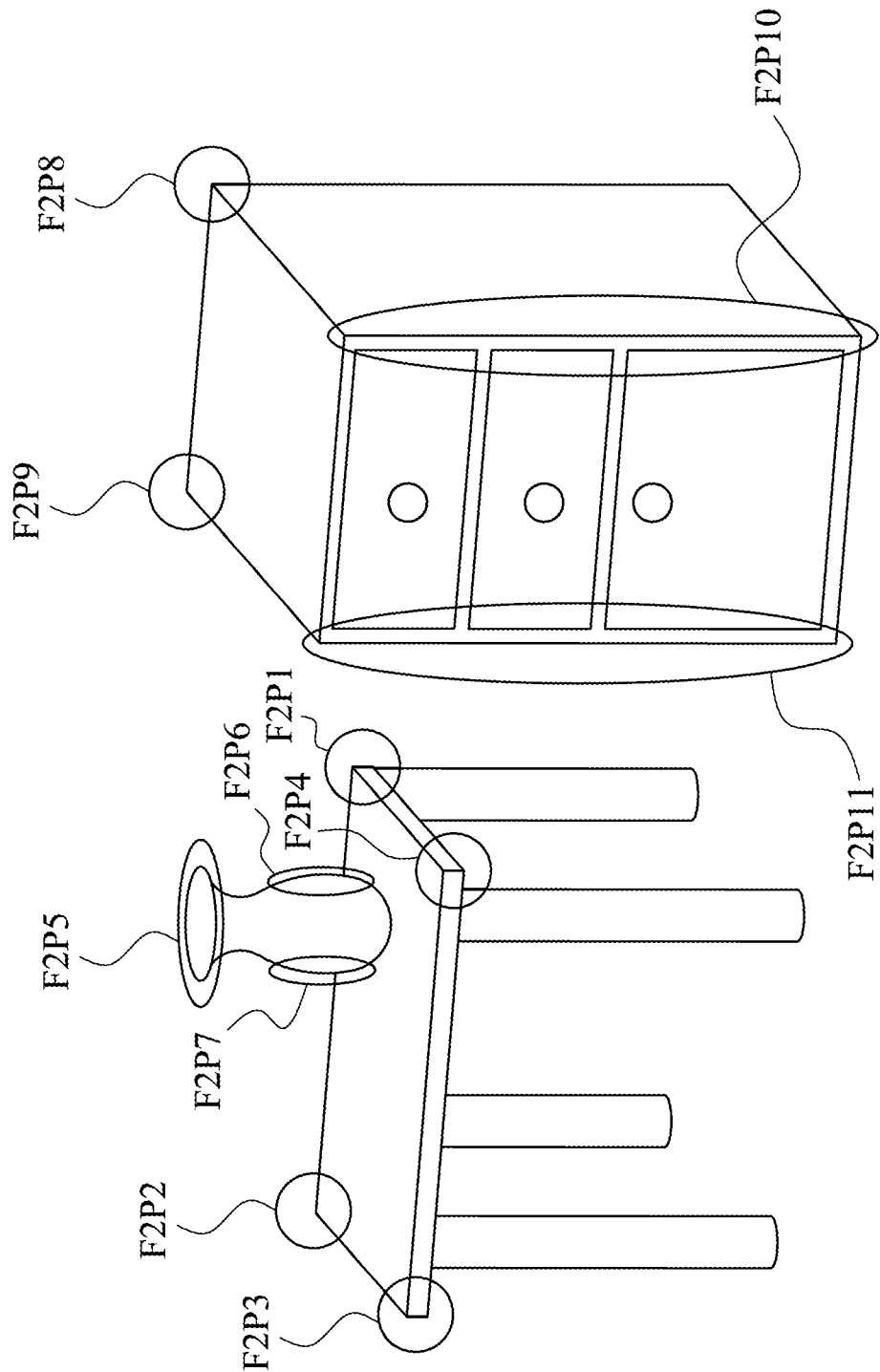
FIG. 5A is a schematic diagram illustrating the feature points of the image according to an embodiment of this disclosure.

Afterward, the scene reconstructing method 200 executes step S230 to recognize at least a second object from the image F2 to construct a map M2 of the physical environment PE by the processor 122. In this case, the map M2 is a three dimension map of the physical environment PE. Before constructing the map M2, the processor 122 is configured to recognize the image F2. The recognizing method is similar to aforesaid embodiment. Take the SLAM technology as an example, the processor 122 is configured to extract the feature points from the image F2. Reference is made to FIG. 5A, which is a schematic diagram illustrating the feature points of the image F2 according to an embodiment of this disclosure. In aforesaid embodiment, the processor 122 is configured to extract the feature points F2P1, F2P2, F2P3 and F2P4 of the object O1, the feature points F2P5, F2P6 and F2P7 of the object O3, and the feature points F2P8, F2P9, F2P10 and F2P11 of the object O4 according to the image F2 captured by the camera unit 121.

Figure 5B:
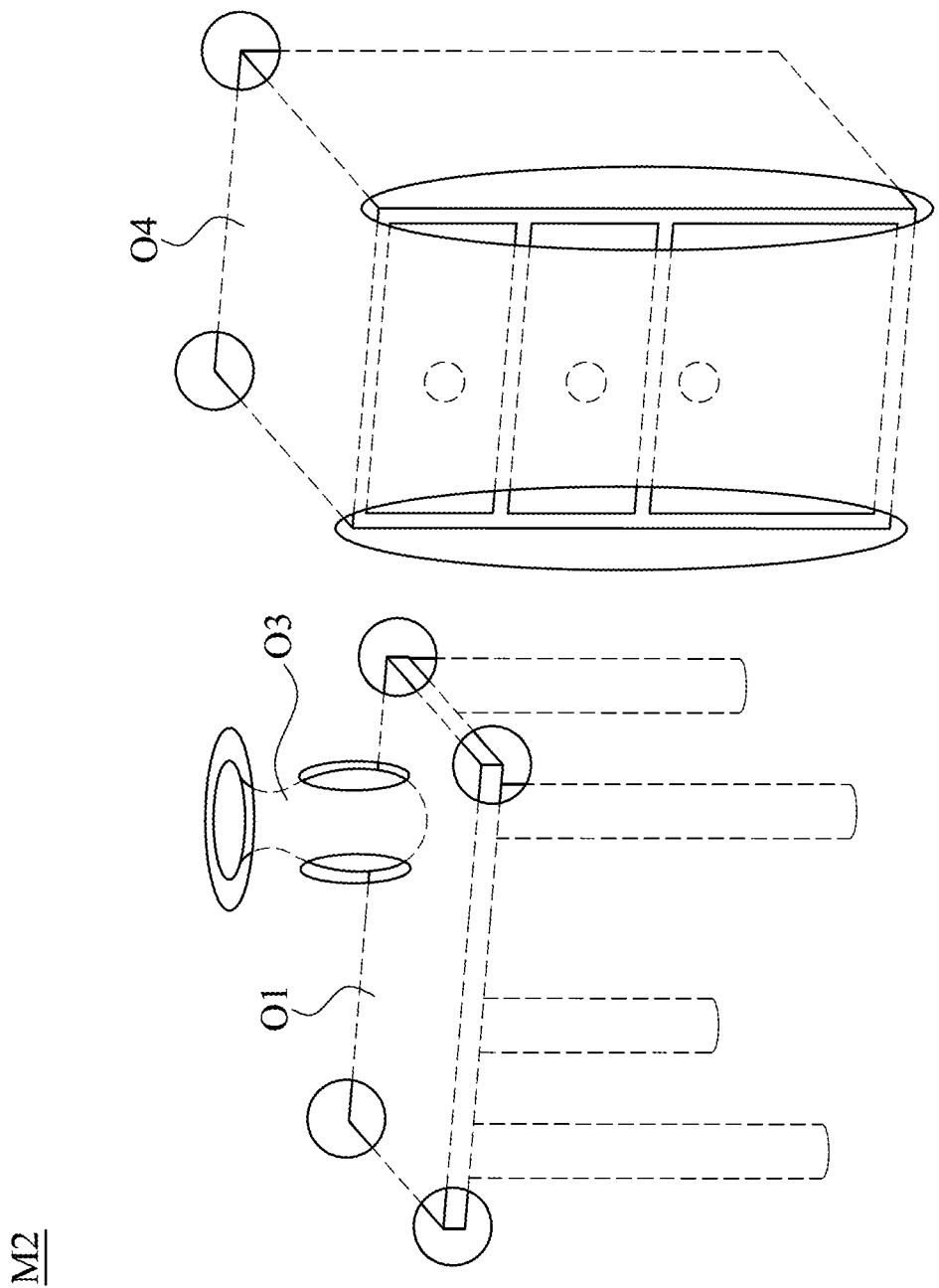
FIG. 5B is a schematic diagram illustrating the map according to an embodiment of this disclosure.

Reference is made to FIG. 5B, which is a schematic diagram illustrating the map M2 according to an embodiment of this disclosure. For the similar reason, the processor 122 is configured to construct the map M2 according to the feature points F2P1~F2P11. As shown in FIG. 5B, the feature points F2P1~F2P4 can be recognized as the object O1; the feature points F2P5~F2P7 can be recognized as the object O3, and the feature points F2P8~F2P11 can be recognized as the object O4.

Afterward, the scene reconstructing method 200 executes step S240 to match the map M1 and the map M2 to align a coordinate system of the map M2 and a coordinate system of the map M1 by the processor 112. In the embodiment, the processor 112 is configured to match the feature points F1P1~F1P9 and the feature points F2P1~F2P11, if portion of the feature points F2P1~F2P11 are matched with portion of the feature points F1P1~F1P9, the coordinate system of the map M2 is transformed to the coordinate system of the map M1.

Afterward, in this case, the feature points F1P1~F1P7 are matched with the feature points F2P1~F2P7, and therefore the coordinate system of electronic device 120 will be mapped to the coordinate system of electronic device 110. After executing the step S240, the electronic device 110 and 120 can utilize matched feature points (e.g. the feature points F1P1~F1P7 and F2P1~F2P7) to describe relative position of the object in the physical environment PE. For example, the object O2 does not exist in the map M2. However, when the coordinate system of electronic device 110 and the coordinate system of electronic device 120 are matched, if the electronic device 110 transmitted relative position of the object O2 to the electronic device 120, the electronic device 120 can calculate position of the object O2 according to the coordinate system of the map M2.

Afterward, it is noticed that, the object O4 does not exist in the map M1, and the electronic device 120 will not transmit the information of the object O4 to the electronic device 110. Therefore, the electronic device 110 does not need to render a model of the object O4 (e.g. a model of the cupboard) on the map M1. The information of the electronic device 110 does not need to be completely shared with the electronic device 120, or vice versa.

Figure 6:
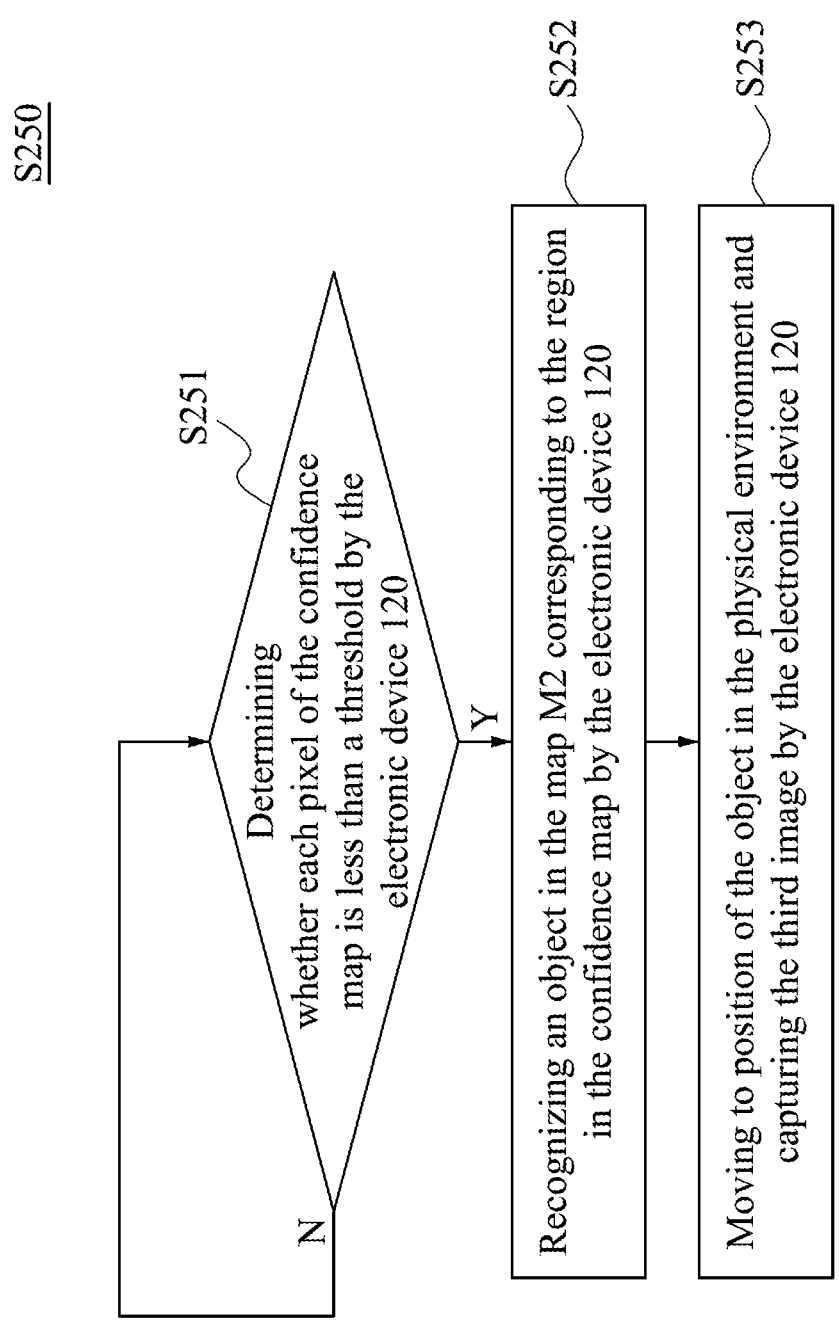
FIG. 6 is a flow diagram illustrating step S250 according to an embodiment of this disclosure.

Afterward, the scene reconstructing method 200 executes step S250 to transmit a location information to the electronic device 120 according to the plurality of confidence values by the electronic device 110 and capture an image F3 corresponding to the location information of the physical environment PE by the electronic device 120. In the embodiment, the location information includes a confidence map composed by the confidence values, and each pixel of the confidence map is corresponding to each pixel of the map M1. The step S250 further includes steps S251~S253, reference is made to FIG. 6, which is a flow diagram illustrating step S250 according to an embodiment of this disclosure. As the embodiment shown in FIG. 6, the scene reconstructing method 200 executes step S251 to determine whether each pixel of the confidence map is less than a threshold by the electronic device 120. In the embodiment, the confidence map is transmitted to the electronic device 120 and the electronic device 120 is configured to determine the region where the confidence values of the confidence map is less than the threshold.

Afterward, the scene reconstructing method 200 executes step S252 if a region of the confidence map is less than the threshold, recognizing an object in the map M2 corresponding to the region in the confidence map by the electronic device 120. As shown in FIG. 4B, the object O2 cannot be recognized, and thus the region of the object O2 will be the region with the lower confidence values. When the electronic device 120 is configured to determine whether the confidence values are less than the threshold, the confidence values corresponding to the region of the object O2 will be determined less than the threshold.

Figure 7:
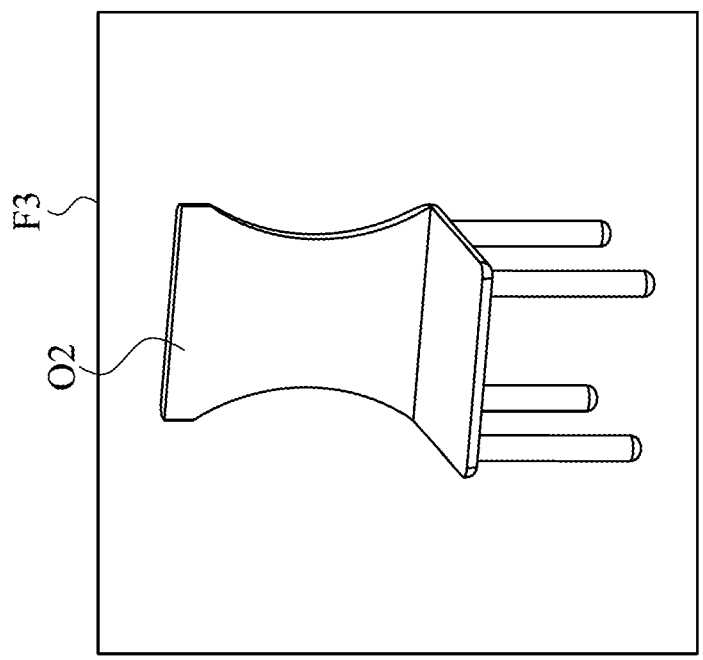
FIG. 7 is a schematic diagram illustrating an image according to an embodiment of this disclosure.

Afterward, the scene reconstructing method 200 executes step S253 to moving to position of the object in the physical environment PE and capturing the image F3 by the electronic device 120. Reference is made to FIG. 7, which is a schematic diagram illustrating an image F3 according to an embodiment of this disclosure. As shown in FIG. 7, the electronic device 120 is configured to move to the vicinity of the object O2, and capture the image F3 included the object O2 with different angle while moving. It is noticed that, the camera unit 123 is configured to capture the image F3 of the physical environment PE over time, however there is only shown a view of the image F3 in the FIG. 7, and the electronic device 120 is configured to capture multiple images of the object O2 to obtain more complete information of the object O2.

Figure 8:
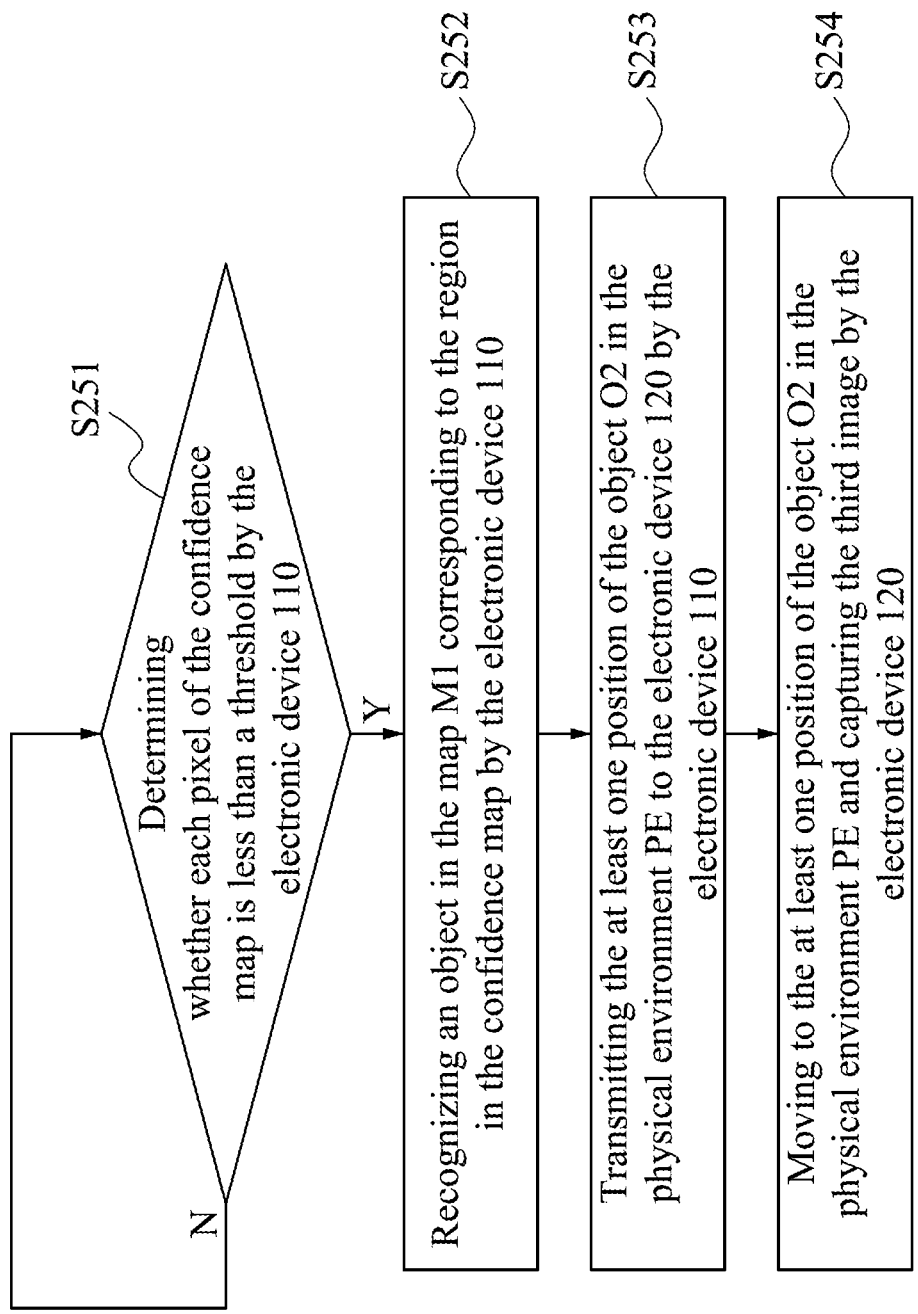
FIG. 8 is a flow diagram illustrating step S250 according to an embodiment of this disclosure.

In another the embodiment, the location information includes at least one position in the physical environment PE. The step S250 further includes steps S251~S254, reference is made to FIG. 8, which is a flow diagram illustrating step S250 according to an embodiment of this disclosure. As the embodiment shown in FIG. 8, the scene reconstructing method 200 executes step S251 to determine whether each pixel of the confidence map is less than a threshold by the electronic device 110. In this case, the electronic device 110 is configured to determine the region of the confidence map is less than the threshold.

Afterward, the scene reconstructing method 200 executes step S252 if a region of the confidence map is less than the threshold, recognizing an object in the map M1 corresponding to the region in the confidence map by the electronic device 110. As shown in FIG. 4B, the object O2 cannot be recognized, and thus the region of the object O2 will be the region with the lower confidence values. When the electronic device 110 is configured to determine whether the confidence values are less than the threshold, the confidence values corresponding to the region of the object O2 will be determined less than the threshold.

Afterward, the scene reconstructing method 200 executes step S253 to transmitting the at least one position of the object O2 in the physical environment PE to the electronic device 120 by the electronic device 110 and step S254 to moving to the at least one position of the object O2 in the physical environment PE and capturing the image F3 by the electronic device 120. In the embodiment, the at least one position of the object O2 will be calculated by the electronic device 110. The electronic device 120 is configured to move to the vicinity the object O2, and capture the image F3 included the object O2 with different angle while moving, as shown in FIG. 7. It is noticed that, the at least one position of the object O2 can be realized as the coordinate of the object O2 or the coordinate of a region corresponding to the object O2.

Figure 9A:
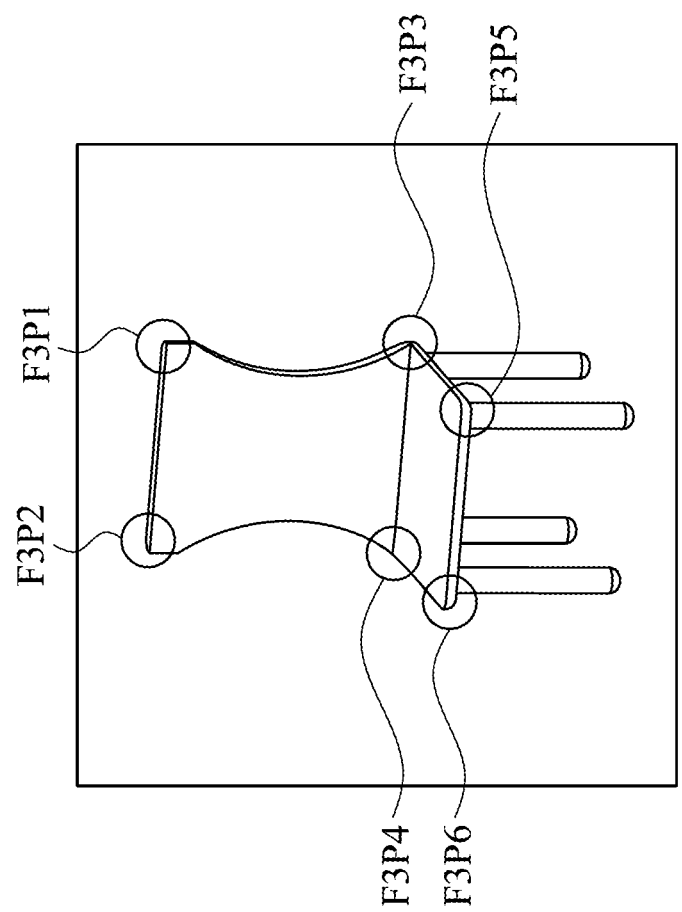
FIG. 9A is a schematic diagram illustrating the feature points of the image according to an embodiment of this disclosure.

Afterward, the scene reconstructing method 200 executes step S260 to transmit the image F3 to the electronic device 110 by the electronic device 120 and recognize at least a third object from the image F3 by the electronic device 110 and step S270 to reconstruct the map M1 according to the at least the third object by the electronic device 110. Reference is made to FIG. 9A, which is a schematic diagram illustrating the feature points of the image F3 according to an embodiment of this disclosure. In aforesaid embodiment, the processor 112 is configured to extract the feature points F3P1, F3P2, F3P3, F3P4, F3P5 and F3P6 of the object O2 according to the image F3 captured by the camera unit 111.

Figure 9B:
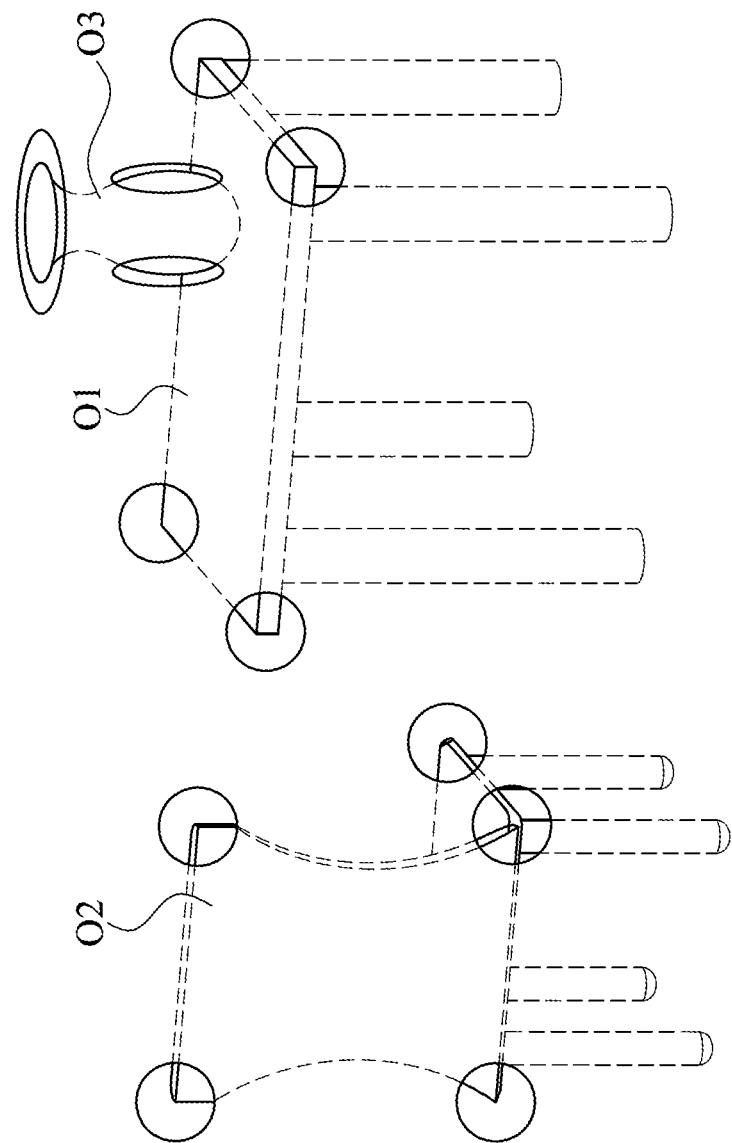
FIG. 9B is a schematic diagram illustrating the map according to an embodiment of this disclosure.

Reference is made to FIG. 9B, which is a schematic diagram illustrating the map M1 according to an embodiment of this disclosure. In the embodiment, the processor 112 is configured to reconstruct the map M1 according to the feature points F3P1~F3P6, and the region of the object O2 can be recognized. Thus, the map M1 includes the object O1, the object O2 and object O3. In another embodiment, if it is utilized the deep neural network algorithm or the support vector machines to recognize the image F3, the object O2 also can be recognized. Because there has complete information of the object O2 obtained by the electronic device 120, the decision of the deep neural network algorithm or the support vector machines will be more accuracy.

In another embodiment, the electronic device 110 can be implemented as a connected car and the electronic device 120 can be implemented as other electronic devices outside the vehicle or another connected car. When the user drives the car on the road, the part of the driver's view will be blocked in some situation. In this case, the central processing unit of the car (e.g. the processor 112) can construct the map of the physical environment around the car. If the part of the driver's view is blocked, the blind area is referred to a region of poor confidence values. In this case, the central processing unit of the car (e.g. the processor 112) can transmit the location information (includes confidence map or positions of the blind area) to another connected car or other IoT device (e.g. monitor). Therefore, another connected car or other IoT device can provide views of blind area to support driver. However, the disclosure is not limited thereto.

Another embodiment of the disclosure is a non-transitory computer-readable storage medium. The non-transitory computer readable storage medium stores instructions for performing the scene reconstructing method 200 in aforesaid embodiment shown in FIG. 2.

Based on aforesaid embodiments, scene reconstructing system, scene reconstructing method, and non-transitory computer-readable medium are capable of calculating a plurality of confidence values corresponding to the map; transmitting a location information to another electronic device; capturing a third image corresponding to the location information of the physical environment by another electronic device, and reconstructing the map according to the third image. In some embodiments, the head-mounted display is able to reconstruct the map according to more complete information of the physical environment.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A scene reconstructing system, comprising:
    a first electronic device located in a physical environment, the first electronic device comprising:
        a first camera unit configured for capturing a first image of the physical environment;
        a first processor, coupled to the first camera unit and configured for recognizing at least a first object from the first image to construct a first map of the physical environment; and
        a first communication unit coupled to the first processor; and
    a second electronic device located in the physical environment, the second electronic device comprising:
        a second camera unit configured for capturing a second image of the physical environment;
        a second processor coupled to the second camera unit and configured for recognizing at least a second object from the second image to construct a second map of the physical environment, and calculating a plurality of confidence values corresponding to the second map; and
        a second communication unit coupled to the second processor and configured for transmitting a location information to the first communication unit according to the plurality of confidence values,
    wherein the first camera unit is configured for capturing a third image corresponding to the location information of the physical environment, and the first communication unit is further configured for transmitting the third image to the second communication unit; the second processor is configured for recognizing at least a third object from the third image and reconstructing the second map according to the at least the third object.

2. The scene reconstructing system of claim 1, wherein the second processor is further configured for executing following steps:
    matching a plurality of first feature points extracted from the first image and a plurality of second feature points extracted from the second image; and
    if portion of the plurality of second feature points are matched with portion of the plurality of first feature points, first coordinate system of the first map is transformed to second coordinate system of the second map.

3. The scene reconstructing system of claim 1, wherein the location information includes a confidence map composed by the plurality of confidence values, and each pixel of the confidence map is corresponding to each pixel of the second map.

4. The scene reconstructing system of claim 3, wherein the first processor is further configured for executing following steps:
    determining whether each pixel of the confidence map is less than a threshold;
    if a region of the confidence map is less than the threshold, recognizing an object in the first map corresponding to the region in the confidence map; and
    moving to position of the object in the physical environment and capturing the third image.

5. The scene reconstructing system of claim 1, wherein the location information includes at least one position in the physical environment.

6. The scene reconstructing system of claim 5, wherein the second processor is further configured for executing following steps:
    determining whether each pixel of a confidence map is less than a threshold, wherein the confidence map composed by the plurality of confidence values;
    if a region of the confidence map is less than the threshold, recognizing an object in the second map corresponding to the region in the confidence map; and
    transmitting the at least one position of the object in the physical environment to the first electronic device.

7. The scene reconstructing system of claim 6, wherein the first processor is further configured for executing following steps:
    moving to the at least one position of the object in the physical environment and capturing the third image.

8. The scene reconstructing system of claim 2, wherein the plurality of confidence values is calculated by amount of the plurality of second feature points.

9. A scene reconstructing method, comprising:
    capturing a first image of a physical environment by a first electronic device and capturing a second image of the physical environment by a second electronic device;

recognizing at least a first object from the first image to construct a first map of the physical environment by the first electronic device;

recognizing at least a second object from the second image to construct a second map of the physical environment, and calculating a plurality of confidence values corresponding to the second map by the second electronic device;

transmitting a location information to the first electronic device according to the plurality of confidence values by the second electronic device and capturing a third image corresponding to the location information of the physical environment by the first electronic device;

transmitting the third image to the second electronic device by the first electronic device, and recognizing at least a third object from the third image by the second electronic device; and reconstructing the second map according to the at least the third object by the second electronic device.

10. The scene reconstructing method of claim 9, further comprising:

matching a plurality of first feature points extracted from the first image and a plurality of second feature points extracted from the second image; and if portion of the plurality of second feature points are matched with portion of the plurality of first feature points, first coordinate system of the first map is transformed to second coordinate system of the second map.

11. The scene reconstructing method of claim 9, wherein the location information includes a confidence map composed by the plurality of confidence values, and each pixel of the confidence map is corresponding to each pixel of the second map.

12. The scene reconstructing method of claim 11, further comprising:

determining whether each pixel of the confidence map is less than a threshold by the first electronic device;

if a region of the confidence map is less than the threshold, recognizing an object in the first map corresponding to the region in the confidence map by the first electronic device; and moving to position of the object in the physical environment and capturing the third image by the first electronic device.

13. The scene reconstructing method of claim 9, wherein the location information includes at least one position in the physical environment.

14. The scene reconstructing method of claim 13, further comprising:

determining whether each pixel of a confidence map is less than a threshold by the second electronic device, wherein the confidence map composed by the plurality of confidence values;

if a region of the confidence map is less than the threshold, recognizing an object in the second map corresponding to the region in the confidence map by the second electronic device;

transmitting the at least one position of the object in the physical environment to the first electronic device by the second electronic device; and moving to the at least one position of the object in the physical environment and capturing the third image by the first electronic device.

15. The scene reconstructing method of claim 10, wherein the plurality of confidence values is calculated by amount of the plurality of second feature points.

16. A non-transitory computer-readable medium including one or more sequences of instructions to be executed by a first processor of a first electronic device and a second processor of a second electronic device for performing a scene reconstructing method, wherein the method comprises:

capturing a first image of a physical environment by the first electronic device and capturing a second image of the physical environment by the second electronic device;

recognizing at least a first object from the first image to construct a first map of the physical environment by the first electronic device;

recognizing at least a second object from the second image to construct a second map of the physical environment, and calculating a plurality of confidence values corresponding to the second map by the second electronic device;

transmitting a location information to the first electronic device according to the plurality of confidence values by the second electronic device and capturing a third image corresponding to the location information of the physical environment by the first electronic device;

transmitting the third image to the second electronic device by the first electronic device, and recognizing at least a third object from the third image by the second electronic device; and reconstructing the second map according to the at least the third object by the second electronic device.

17. The non-transitory computer-readable medium of claim 16, further comprising:

matching a plurality of first feature points extracted from the first image and a plurality of second feature points extracted from the second image; and if portion of the plurality of second feature points are matched with portion of the plurality of first feature points, first coordinate system of the first map is transformed to second coordinate system of the second map.

18. The non-transitory computer-readable medium of claim 16, wherein the location information includes a confidence map composed by the plurality of confidence values, and each pixel of the confidence map is corresponding to each pixel of the second map.

19. The non-transitory computer-readable medium of claim 18, further comprising:

determining whether each pixel of the confidence map is less than a threshold by the first electronic device;

if a region of the confidence map is less than the threshold, recognizing an object in the first map corresponding to the region in the confidence map by the first electronic device; and moving to position of the object in the physical environment and capturing the third image by the first electronic device.

20. The non-transitory computer-readable medium of claim 16, wherein the location information includes at least one position in the physical environment.

21. The non-transitory computer-readable medium of claim 20, further comprising:

determining whether each pixel of a confidence map is less than a threshold by the second electronic device, wherein the confidence map composed by the plurality of confidence values;

if a region of the confidence map is less than the threshold, recognizing an object in the second map corresponding to the region in the confidence map by the second electronic device;

transmitting the at least one position of the object in the physical environment to the first electronic device by the second electronic device; and moving to the at least one position of the object in the physical environment and capturing the third image by the first electronic device.

\* \* \* \* \*